United States Patent Office 3,080,706
Patented Mar. 12, 1963

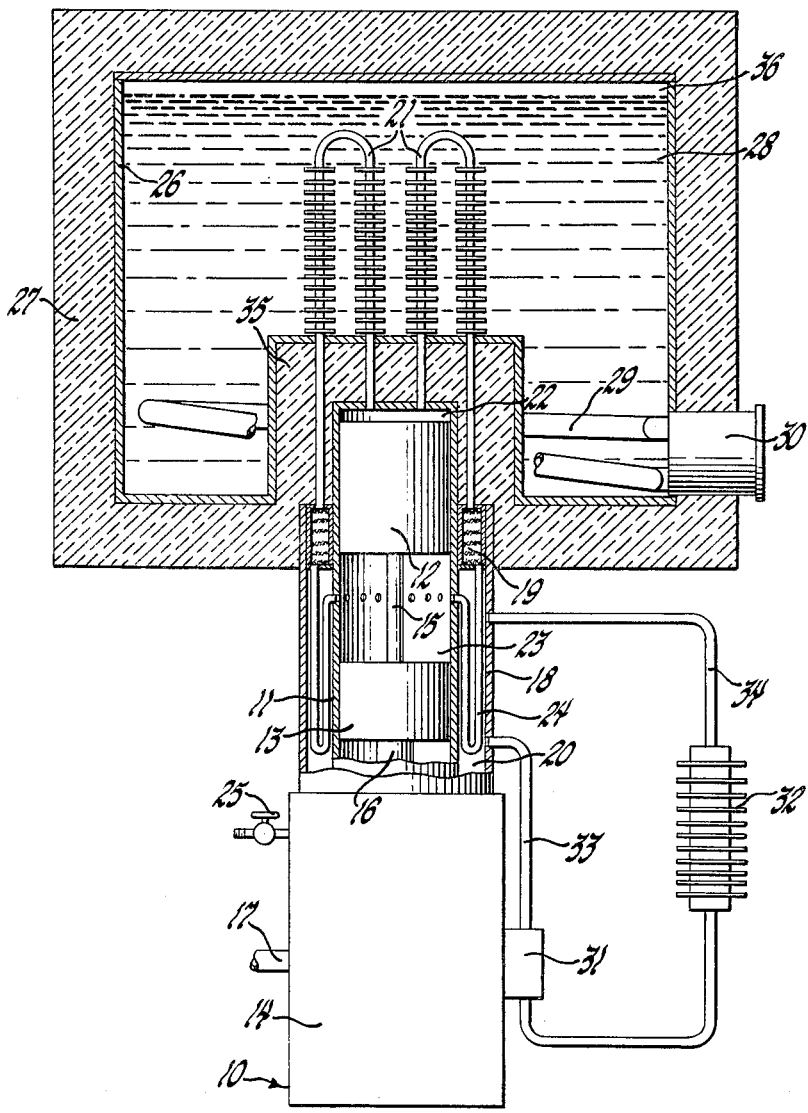

3,080,706
HEAT STORAGE OPERATED STIRLING CYCLE ENGINE
Gregory Flynn, Jr., Grosse Pointe Park, and Worth H. Percival, New Baltimore, Mich., assignors to General Motors Corporation, Detroit, Mich., a corporation of Delaware
Filed Feb. 18, 1960, Ser. No. 9,544
7 Claims. (Cl. 60—24)

This invention relates to Stirling cycle engines and, more particularly, to an arrangement wherein such an engine is operated solely by heat stored in an associated container.

In many instances it is desirable to have a heat engine operate at times when the primary source of heat energy is unavailable. For example, an engine that operates on solar energy cannot operate at night unless excess heat is stored during the day. Submarine engines present a similar situation when atmospheric communication is required for combustion. Similarly, it is sometimes desirable to provide special purpose vehicles with a power plant that does not require combustion to occur on the vehicle.

The invention is directed to providing a Stirling cycle engine with a high capacity heat storage arrangement so that the engine can be operated therefrom for extended periods away from the primary heat source.

The drawing is an elevation, partially broken away, of a Stirling cycle engine in combination with a heat storage container.

Referring to the drawing the power plant including a Stirling cycle engine 10 which has an engine cylinder 11 containing a displacer piston 12 and a work piston 13 which operate crankshaft means in a crankcase 14 by coaxial reciprocating piston rods 15 and 16 to produce shaft power at the crankshaft 17. An outer casing 18 encloses the cylinder 11 to form a regenerator enclosure 19 and a cooler enclosure 20. Heater conduits 21 connect the engine working fluid hot space 22 to the engine working fluid cold space 23 by way of the regenerator 19 and cooler conduits 24, the regenerator space being filled with fine wire mesh elements that serve as heat storage means for the working fluid that is shuttled between the hot and cold spaces on piston movement. The working fluid may be a gas such as hydrogen or helium at an average system pressure in excess of 1000 lbs. per square inch. A valve 25 is provided to release the pressure of the working fluid and stop the engine.

An enclosure 26, heavily insulated as at 27, contains a suitable heat storage substance 28 and the heater conduits 21 are immersed therein so that the heat storage substance can supply heat to the gas as it shuttles between the hot and cold spaces 22 and 23. Heat is supplied to the heat storage substance 28 by a heater coil 29 which has a disconnectable coupling 30 to any suitable primary heat source such as an electric outlet or a circulating high temperature fluid heating system. The heat storage medium 28 is thus utilized to furnish heat energy to the working medium of the engine and the engine is provided with a pump 31 which circulates a coolant fluid, such as water, between the coolant enclosure 20 and a radiator 32 by way of conduits 33 and 34 to provide a heat sink for the engine. Reference may be had to the Philips Technical Review, volume 29, Number 9, pages 245–262, 1958/1959, for a more detailed disclosure of the engine.

Since it is required that the engine be able to operate for considerable periods of time when the coupling 30 is disconnected from the primary heat source, it is necessary that the accumulator 26 have an unusually high heat storage capacity. In order that the quantity of heat storage substance be held to a minimum, it is necessary that the substance have a very high heat of fusion and that its melting point be within the operating temperature range of the engine. High temperature resistant materials, such as stainless steel, may be employed for the hot end of the engine to enable high melting point heat storage substances to be used. The preferred substances are lithium compounds such as lithium hydride, lithium hydroxide and lithium fluoride. Lithium hydride, for example, is a translucent crystalline mass in the solid state, has a melting point of 1256° F. and a heat of fusion in the neighborhood of 1500 B.t.u.'s per pound. Lithium fluoride is a white powder in the solid state, has a melting point of 1558° F. and a heat of fusion in the neighborhood of 480 B.t.u.'s per pound. Lithium hydroxide is a white powder in the solid rate, has a melting point of 884° F. and a heat of fusion in the neighborhood of 380 B.t.u.'s per pound.

It will be noted that the insulation 27 separates the engine cylinder 11 from the container 26 as at 35. The main body of the engine is thus protected on shutdown from the high temperature of the heat storage substance. An inert gas is provided in the container 26 in a small space 36 above the heat storage substance 28 to accommodate for the thermal expansion thereof. While the means for intermittently supplying heat to the heat storage substance 28 has been illustrated as an electric resistance hot liquid transfer coil 29, it may be desirable in some applications to supply the heat by powering the engine in reverse direction through the crankshaft 17 whereupon the radiator 32 will turn into an extremely low temperature cooler and the heater tubes 21 will transfer heat to the heat storage substance.

We claim:

1. A Stirling cycle engine comprising a cylinder having a displacer piston and a power piston therewith defining a hot chamber and a cold chamber, an output shaft, means operatively connecting said pistons to said shaft, a regenerator, conduit means connecting said hot chamber with said regenerator, means connecting said cold chamber with said regenerator, a working gas medium in said conduit means, regenerator and chambers, a heater means for the working gas medium in said conduit means comprising an insulated container outside of said hot chamber and having a heat storage substance therein and containing said conduit means immersed in said heat storage substance, and means for supplying heat to said heat storage substance during one period, said heat storage substance being characterized by a heat of fusion in excess of 300 B.t.u.'s per pound and a melting point in excess of 800° F. and within the operating temperature range of the engine and being of sufficient amount in said insulated container that the heat required by the working gas medium to operate the engine for a substantial time during another period when said heat storage substance heat supplying means is inoperative is acquired solely from said heat storage substance.

2. Apparatus in accordance with claim 1 wherein said heat storage substance is a metal compound selected from the group consisting of lithium hydride, lithium fluoride and lithium hydroxide.

3. Apparatus in accordance with claim 1 wherein said heat storage substance comprises lithium hydroxide.

4. Apparatus in accordance with claim 1 wherein said insulated container has insulation between said cylinder and heat storage substance to reduce heat transfer to said engine other than through said conduit means.

5. Apparatus in accordance with claim 4 wherein said means for supplying heat to said heat storage substance during one period comprises an electric resistance unit in said container.

6. Apparatus in accordance with claim 4 wherein said means for supplying heat to said heat storage substance during one period comprising a high temperature fluid transfer coil in said container.

7. Apparatus in accordance with claim 4 wherein said heat storage substance is a metal compound selected from the group consisting of lithium hydride, lithium fluoride and lithium hydroxide.

References Cited in the file of this patent

UNITED STATES PATENTS

| | | |
|---|---|---|
| 2,484,127 | Stelzer | Oct. 11, 1949 |
| 2,596,057 | Van Heeckeren et al. | May 6, 1952 |
| 2,621,474 | Dros et al. | Dec. 16, 1952 |
| 2,693,939 | Marchant et al. | Nov. 9, 1954 |
| 2,724,248 | Finkelstein et al. | Nov. 22, 1955 |
| 3,015,475 | Meijer et al. | Jan. 2, 1962 |